United States Patent
Nguyen et al.

(10) Patent No.: US 10,053,946 B2
(45) Date of Patent: Aug. 21, 2018

(54) FULL BORE COMPRESSION SEALING METHOD

(75) Inventors: Dennis P. Nguyen, Pearland, TX (US); Kirk P. Guidry, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 628 days.

(21) Appl. No.: 13/144,282

(22) PCT Filed: Feb. 16, 2010

(86) PCT No.: PCT/US2010/024339
§ 371 (c)(1),
(2), (4) Date: Jul. 12, 2011

(87) PCT Pub. No.: WO2010/110953
PCT Pub. Date: Sep. 30, 2010

(65) Prior Publication Data
US 2012/0007314 A1 Jan. 12, 2012

Related U.S. Application Data (60) Provisional application No. 61/164,362, filed on Mar. 27, 2009.

(51) Int. Cl.
*F16J 15/06* (2006.01)
*E21B 33/128* (2006.01)

(52) U.S. Cl.
CPC ........... *E21B 33/128* (2013.01); *F16J 15/06* (2013.01); *F16J 15/068* (2013.01)

(58) Field of Classification Search
CPC ................. F16J 15/06; F16J 15/068
USPC ....... 277/584, 638, 611, 329, 337, 339, 529, 277/530, 531
See application file for complete search history.

(56) References Cited

U.S. PATENT DOCUMENTS

| | | | | |
|---|---|---|---|---|
| 869,374 A | * | 10/1907 | Law | 277/531 |
| 1,787,020 A | * | 12/1930 | Sautter | 277/533 |
| 1,868,199 A | * | 7/1932 | Pelterie | 277/437 |
| 1,924,555 A | * | 8/1933 | Hubbard | 277/530 |
| 1,946,353 A | * | 2/1934 | Mack | 166/196 |

(Continued)

FOREIGN PATENT DOCUMENTS

| | | |
|---|---|---|
| EP | 0141726 | 5/1985 |
| GB | 2429473 A | 2/2007 |
| WO | WO2005022012 | 3/2005 |

OTHER PUBLICATIONS

PCT Search Report and Written Opinion of PCT Application No. PCT/US2010/024339 dated Dec. 29, 2010.

(Continued)

*Primary Examiner* — Kristina R Fulton
*Assistant Examiner* — L. Susmitha Koneru
(74) *Attorney, Agent, or Firm* — Fletcher Yoder, P.C.

(57) ABSTRACT

An annular seal, in certain embodiments, includes a top seal section, a bottom seal section, and a core seal section including non-orthogonal top and bottom faces relative to a radial axis of the core seal section disposed between the top seal section and the bottom seal section. The core seal section is configured to expand radially when an axial load is applied to the top and bottom faces of the core seal section such that the top and bottom faces are deformed into an orthogonal alignment relative to the radial axis of the core seal section.

31 Claims, 8 Drawing Sheets

(56) References Cited

U.S. PATENT DOCUMENTS

| | | | | |
|---|---|---|---|---|
| 2,237,680 | A * | 4/1941 | Mark | 277/329 |
| 2,254,060 | A * | 8/1941 | Crickmer | 277/337 |
| 2,295,770 | A * | 9/1942 | Baker | 277/337 |
| 2,357,257 | A * | 8/1944 | Goetze | 277/610 |
| 2,918,336 | A * | 12/1959 | Slough et al. | 92/244 |
| 3,009,721 | A * | 11/1961 | Newton | 277/529 |
| 3,179,426 | A * | 4/1965 | Duer | 277/529 |
| 3,220,756 | A * | 11/1965 | Templeton | 403/162 |
| 3,290,068 | A * | 12/1966 | Jackson | 285/276 |
| 3,479,840 | A * | 11/1969 | Meyers | 464/131 |
| 3,606,348 | A * | 9/1971 | Taylor | 77/328 |
| 3,784,214 | A | 1/1974 | Tamplen | |
| 3,869,132 | A * | 3/1975 | Taylor et al. | 277/608 |
| 3,915,462 | A * | 10/1975 | Bruns et al. | 277/647 |
| 4,089,534 | A * | 5/1978 | Litherland | 277/566 |
| 4,090,719 | A * | 5/1978 | Simanskis et al. | 277/448 |
| 4,116,451 | A * | 9/1978 | Nixon et al. | 277/554 |
| 4,131,287 | A * | 12/1978 | Gunderson et al. | 277/328 |
| 4,138,144 | A * | 2/1979 | Pierce, Jr. | 285/18 |
| 4,219,204 | A * | 8/1980 | Pippert | 277/584 |
| 4,324,422 | A * | 4/1982 | Rains et al. | 285/123.12 |
| 4,327,923 | A * | 5/1982 | Chesterton et al. | 277/531 |
| 4,349,205 | A * | 9/1982 | McGee et al. | 277/564 |
| 4,353,560 | A * | 10/1982 | Tohill | 277/328 |
| 4,372,563 | A * | 2/1983 | Diehl et al. | 277/328 |
| 4,381,114 | A * | 4/1983 | Vanderford, Jr. | 277/322 |
| 4,384,726 | A * | 5/1983 | Meyer | 277/329 |
| 4,390,063 | A * | 6/1983 | Wells, Jr. | 166/84.5 |
| 4,394,023 | A * | 7/1983 | Hinojosa | 277/539 |
| 4,447,038 | A * | 5/1984 | Floyd | 277/325 |
| 4,451,047 | A * | 5/1984 | Herd et al. | 277/539 |
| 4,468,042 | A * | 8/1984 | Pippert et al. | 277/638 |
| 4,496,162 | A * | 1/1985 | McEver et al. | 277/336 |
| 4,521,040 | A * | 6/1985 | Slyker et al. | 285/123.12 |
| 4,554,973 | A | 11/1985 | Shonrock et al. | |
| 4,580,593 | A * | 4/1986 | Herberholz | 137/375 |
| 4,613,140 | A * | 9/1986 | Knox | 277/329 |
| 4,749,043 | A * | 6/1988 | Rodenberger | 166/321 |
| 4,892,320 | A * | 1/1990 | Tuckmantel | 277/535 |
| 5,165,703 | A * | 11/1992 | Morvant | 277/342 |
| 5,201,532 | A * | 4/1993 | Salesky et al. | 277/530 |
| 5,271,468 | A * | 12/1993 | Streich et al. | 166/387 |
| 5,297,805 | A * | 3/1994 | Merkin et al. | 277/322 |
| 5,342,066 | A * | 8/1994 | Henley et al. | 277/329 |
| 5,411,274 | A * | 5/1995 | Yahagi et al. | 277/626 |
| 5,476,271 | A | 12/1995 | Hatting et al. | |
| 5,803,464 | A * | 9/1998 | Ueda et al. | 277/528 |
| 5,857,520 | A * | 1/1999 | Mullen et al. | 166/196 |
| 5,895,053 | A * | 4/1999 | Bauman et al. | 277/566 |
| 5,904,354 | A * | 5/1999 | Collins | 277/328 |
| 6,179,297 | B1 * | 1/2001 | Bauman et al. | 277/437 |
| 6,182,755 | B1 | 2/2001 | Mansure | |
| 6,250,604 | B1 * | 6/2001 | Robert | 251/214 |
| 6,431,552 | B1 * | 8/2002 | Ulrich | 277/558 |
| 6,598,672 | B2 * | 7/2003 | Bell et al. | 166/118 |
| 6,648,337 | B1 * | 11/2003 | Baehl et al. | 277/584 |
| 6,976,548 | B2 * | 12/2005 | Neville et al. | 175/371 |
| 7,597,360 | B2 * | 10/2009 | Kubala | 285/98 |
| 8,083,001 | B2 * | 12/2011 | Conner et al. | 166/387 |
| 8,167,033 | B2 * | 5/2012 | White | 166/196 |
| 8,235,396 | B2 * | 8/2012 | Keene et al. | 277/603 |
| 8,393,400 | B2 * | 3/2013 | Buckle | 166/368 |
| 8,403,036 | B2 * | 3/2013 | Neer et al. | 166/134 |
| 2006/0232019 | A1 * | 10/2006 | Garrison et al. | 277/611 |
| 2007/0240877 | A1 | 10/2007 | O'Malley et al. | |
| 2009/0066030 | A1 * | 3/2009 | Avant et al. | 277/337 |
| 2010/0148447 | A1 * | 6/2010 | Halling | 277/314 |
| 2010/0327532 | A1 * | 12/2010 | Thomson | 277/328 |
| 2011/0057395 | A1 * | 3/2011 | Mercer et al. | 277/314 |
| 2012/0007314 | A1 * | 1/2012 | Nguyen et al. | 277/308 |
| 2012/0285676 | A1 * | 11/2012 | Shaw | 166/88.1 |

OTHER PUBLICATIONS

Singapore Written Opinion; Application No. 201207163-5; dated Aug. 7, 2014; 13 pages.

Singapore Written Opinion; Application No. 201105478-0; dated Jun. 1, 2012; 9 pages.

Great Britain Examination Report; Application No. GB1118135.1; dated May 16, 2013; 2 pages.

\* cited by examiner

FULL BORE COMPRESSION SEALING METHOD

CROSS-REFERENCE TO RELATED APPLICATIONS

This application claims priority to and benefit of PCT Patent Application No. PCT/US2010/024339, entitled "Full Bore Compression Sealing Method," filed Feb. 16, 2010, which is herein incorporated by reference in its entirety, and which claims priority to and benefit of U.S. Provisional Patent Application No. 61/164,362, entitled "Full Bore Compression Sealing Method", filed on Mar. 27, 2009, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fluid systems, such as mineral extraction systems (e.g., oil and gas), typically include multiple segments of tubing, valves, and connectors that are sealed together by various seals. These seals are often subjected to harsh environmental conditions, such as corrosive fluids, extreme pressures, and extreme temperatures. Moreover, these seals are often disposed in remote equipment, such as a marine (e.g., sub-sea) wellhead, which can make access and repair difficult and expensive. Over time, these seals tend to lose their memory or shape. When this type of damage occurs, the seals begin to hold pressure less effectively, particularly at high pressures and sub-ambient temperatures. As such, it may be important to ensure that these seals are installed in a manner which minimizes damage (e.g., extrusion) during installation.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain exemplary embodiments of the present invention include systems and methods for using an annular seal configured to expand radially when subjected to an axial force. More specifically, the annular seal may include a top seal section, a bottom seal section, and a core seal section. The core seal section may include non-orthogonal top and bottom faces when in a non-deformed shape. In addition, when in the non-deformed shape, the annular seal may be capable of being run into a wellhead while leaving a gap between the annular seal and inner and outer bodies through which the annular seal is run. This gap may reduce the likelihood of damage, such as extrusion.

When the axial force is exerted on the annular seal, the core seal section may expand radially, causing the annular seal to form a seal between the inner and outer bodies. In addition, the axial force may also cause the top and bottom faces of the core seal section to be deformed into an orthogonal alignment, causing the annular seal to form a seal between upper and lower bodies above and below the annular seal, respectively. In certain embodiments, the top and bottom seal sections may be configured to urge the top and bottom faces of the core seal section into the orthogonal alignment. For example, the top and bottom seal sections may be formed of harder materials pre-loaded in a manner biased toward orthogonal alignment of the top and bottom faces of the core seal section.

As will be appreciated, in the present context described herein, when the top and bottom faces of the core seal section are described as non-orthogonal when in a non-deformed shape, this means that the top and bottom faces of the core seal section do not form perpendicular surfaces relative to radially inner and outer faces of the core seal section. In other words, the top and bottom faces are not flat or parallel to a radial axis of the core seal section. Conversely, when the top and bottom faces of the core seal section are described as being brought into an orthogonal alignment when in a deformed shape due at least in part to the axial force, this means that the top and bottom faces of the core seal section are deformed in such a way that the top and bottom faces form substantially perpendicular surfaces relative to the radially inner and outer faces of the core seal section. In other words, the top and bottom faces become substantially flat and parallel to the radial axis of the core seal section.

Figure 1:
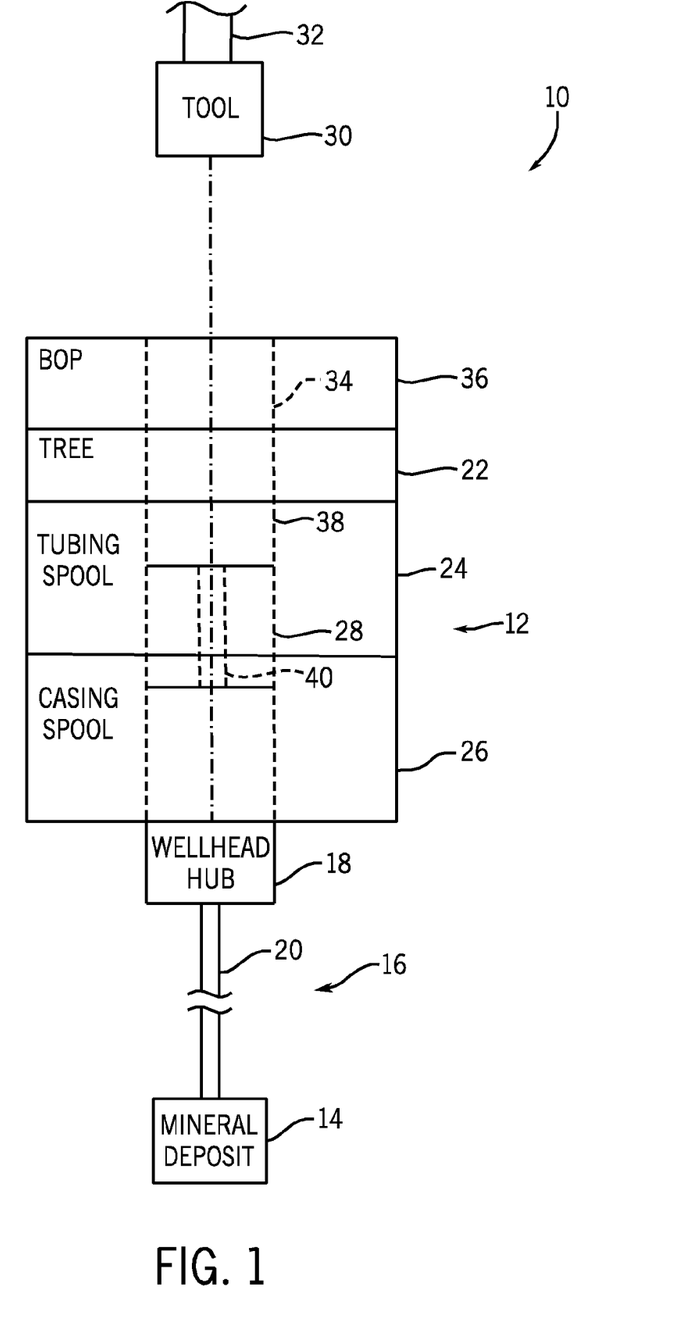
FIG. 1 is a block diagram illustrating a mineral extraction system in accordance with an embodiment of the present invention.

FIG. 1 is a block diagram that illustrates an embodiment of a mineral extraction system 10. As discussed below, one or more seals may be employed throughout the system 10. The illustrated mineral extraction system 10 may be configured to extract various minerals and natural resources, including hydrocarbons (e.g., oil and/or natural gas), from the earth, or to inject substances into the earth. In some embodiments, the mineral extraction system 10 is land-based (e.g., a surface system) or sub-sea (e.g., a sub-sea system). As illustrated, the system 10 includes a wellhead 12 coupled to a mineral deposit 14 via a well 16. The well 16 may include a wellhead hub 18 and a well bore 20. The wellhead hub 18 generally includes a large diameter hub disposed at the termination of the well bore 20 and designed to connect the wellhead 12 to the well 16.

The wellhead 12 may include multiple components that control and regulate activities and conditions associated with the well 16. For example, the wellhead 12 generally includes bodies, valves, and seals that route produced minerals from the mineral deposit 14, regulate pressure in the well 16, and inject chemicals down-hole into the well bore 20. In the illustrated embodiment, the wellhead 12 includes what is colloquially referred to as a Christmas tree 22 (hereinafter, a "tree"), a tubing spool 24, a casing spool 26, and a hanger 28 (e.g., a tubing hanger and/or a casing hanger). The system 10 may include other devices that are coupled to the wellhead 12, and devices that are used to assemble and control various components of the wellhead 12. For example, in the illustrated embodiment, the system 10 includes a running tool 30 suspended from a drill string 32. In certain embodiments, the running tool 30 is lowered (e.g., run) from an offshore vessel to the well 16 and/or the wellhead 12. In other embodiments, such as surface systems, the running tool 30 may include a device suspended over and/or lowered into the wellhead 12 via a crane or other supporting device.

The tree 22 generally includes a variety of flow paths (e.g., bores), valves, fittings, and controls for operating the well 16. For instance, the tree 22 may include a frame that is disposed about a tree body, a flow-loop, actuators, and valves. Further, the tree 22 may provide fluid communication with the well 16. For example, the tree 22 includes a tree bore 34. The tree bore 34 provides for completion and workover procedures, such as the insertion of tools into the well 16, the injection of various chemicals into the well 16, and so forth. Further, minerals extracted from the well 16 (e.g., oil and natural gas) may be regulated and routed via the tree 22. For instance, the tree 22 may be coupled to a jumper or a flowline that is tied back to other components, such as a manifold. Accordingly, produced minerals may flow from the well 16 to the manifold via the wellhead 12 and/or the tree 22 before being routed to shipping or storage facilities. A blowout preventer (BOP) 36 may also be included, either as a part of the tree 22 or as a separate device. The BOP may consist of a variety of valves, fittings, and controls to prevent oil, gas, or other fluid from exiting the well in the event of an unintentional release of pressure or an overpressure condition.

The tubing spool 24 provides a base for the tree 22. Typically, the tubing spool 24 is one of many components in a modular sub-sea or surface mineral extraction system 10 that is run from an offshore vessel or surface system. The tubing spool 24 includes a tubing spool bore 38. The tubing spool bore 38 connects (e.g., enables fluid communication between) the tree bore 34 and the well 16. Thus, the tubing spool bore 38 may provide access to the well bore 20 for various completion and workover procedures. For example, components can be run down to the wellhead 12 and disposed in the tubing spool bore 38 to seal off the well bore 20, to inject chemicals down-hole, to suspend tools down-hole, to retrieve tools down-hole, and so forth.

The well bore 20 may contain elevated pressures. For example, the well bore 20 may include pressures that exceed 10,000, 15,000, or even 20,000 pounds per square inch (psi). Accordingly, the mineral extraction system 10 may employ various mechanisms, such as seals, plugs, and valves, to control and regulate the well 16. For example, plugs and valves are employed to regulate the flow and pressures of fluids in various bores and channels throughout the mineral extraction system 10. For instance, the illustrated hanger 28 (e.g., tubing hanger or casing hanger) is typically disposed within the wellhead 12 to secure tubing and casing suspended in the well bore 20, and to provide a path for hydraulic control fluid, chemical injections, and so forth. The hanger 28 includes a hanger bore 40 that extends through the center of the hanger 28, and that is in fluid communication with the tubing spool bore 38 and the well bore 20. One or more seals may be disposed between the hanger 28 and the tubing spool 24 and/or the casing spool 26.

Figure 2:
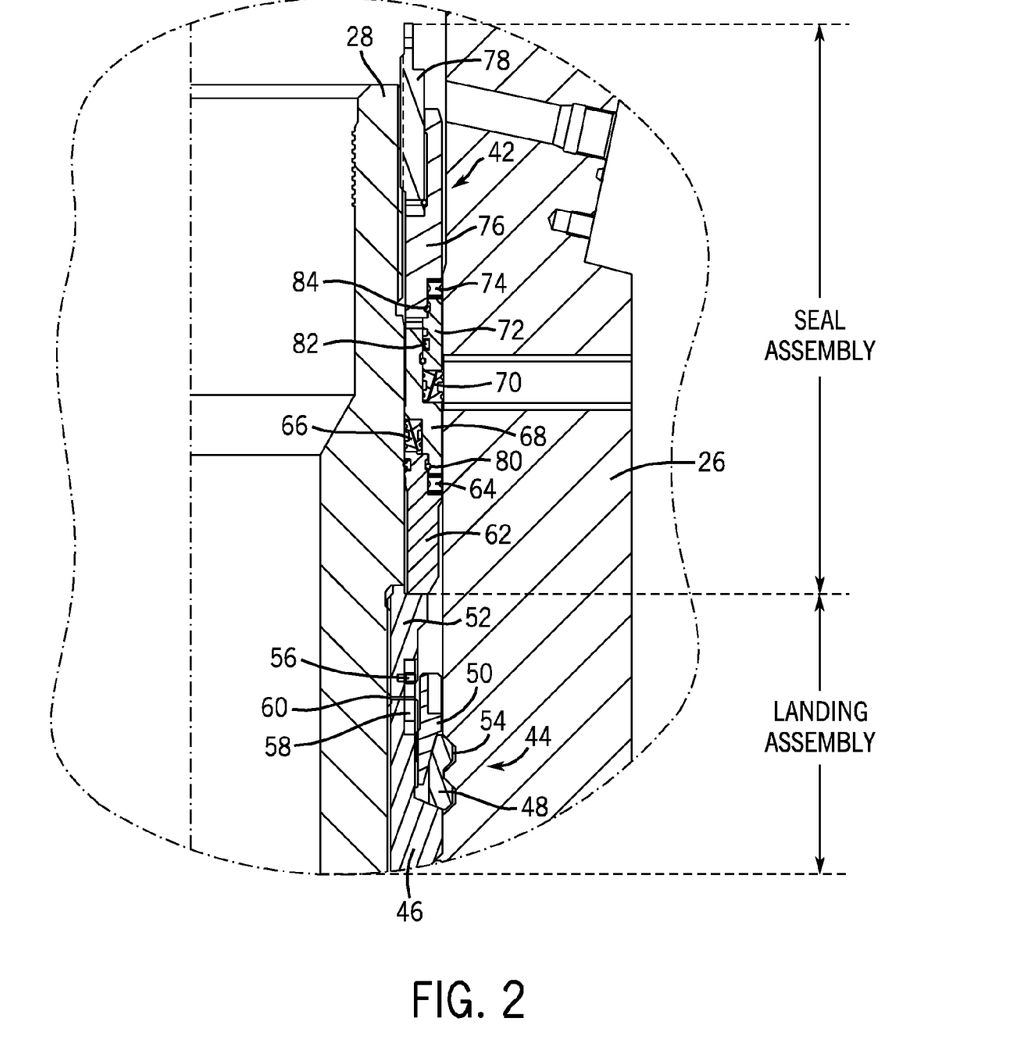
FIG. 2 is a partial cross-section of the casing spool and the hanger of FIG. 1.

FIG. 2 depicts a partial cross-section of the casing spool 26 and the hanger 28 of FIG. 1. The hanger 28 includes a seal assembly 42, which may provide the sealing for the hanger 28 against the wellhead 12 (e.g., against the casing spool 26). The casing spool 26 includes a landing assembly 44 that provides for landing of the hanger 28.

In certain embodiments, the landing assembly 44 may include a bottom landing ring 46, a hanger lockdown ring 48, a lockdown actuation ring 50, and a top landing ring 52. The bottom landing ring 46 may be threaded to the hanger 28. The landing assembly 44 may locate the hanger 28 in place and may be locked into position via the hanger lockdown ring 48 by radially engaging recesses 54 of the wellhead 12 (e.g., the casing spool 26). Once the landing assembly 44 is locked into place, the landing assembly 44 (and the hanger 28) may be locked by actuation of the lockdown actuation ring 50 such that the hanger lockdown ring 48 is locked radially into the recesses 54 of the wellhead 12. The hanger 28 may be adjusted by rotating the hanger 28 via the threads such that the hanger 28 moves along the bottom landing ring 46.

The top landing ring 52 may also be threaded to the hanger 28. In certain embodiments, the top landing ring 52 and bottom landing ring 46 may both couple to the hanger 28 via the same outer diameter threads. The top landing ring 52 may also be coupled to the bottom landing ring 46 via a protrusion 56 (e.g., a tongue) that engages a recess 58 of the bottom landing ring 46. As such, the top landing ring 52 may rotate in sync with the bottom landing ring 46 but may not allow load transfer between the top landing ring 52 and the bottom landing ring 46. In other embodiments, the top landing ring 52 may be coupled to the bottom landing ring 46 via a key and keyway, a castellation feature, or any other suitable mechanism. The protrusion 56 may provide a gap 60 between the bottom landing ring 46 and the top landing ring 52. As a result of the engagement between the top landing ring 52 and the bottom landing ring 46, the top landing ring 52 may isolate any vertical movement of the hanger 28 as a result of pressure either below or above the hanger 28 from the bottom landing ring 46. The top landing ring 52 "rides along" with any movement of the hanger 28 without transferring or off-loading any load, thus preventing damage to the hanger lockdown ring 48 and maintaining integrity of the hanger lockdown ring 48.

In certain embodiments, the seal assembly 42 may include a lower seal body 62, a lower test seal 64, an inner metal seal assembly 66, a middle seal body 68, an outer metal seal assembly 70, an upper seal body 72, an upper test seal 74, an upper seal actuation ring 76, and a carrier nut 78. The lower seal body 62 may abut the top landing ring 52 when the hanger 28 is installed, landed, and sealed in the wellhead 12. The middle seal body 68 may be connected to the lower seal body 62 at seal 80, such that both the lower test seal 64 and the inner metal seal assembly 66 fit between the middle seal body 68 and the lower seal body 62. In certain embodiments, the inner metal seal assembly 66 may include a pair of Canh seals, such as R-Canh or MRD-Canh seals. The upper seal body 72 may be connected to the middle seal body 68 at seal 82, such that the outer metal seal assembly 70 fits between the upper seal body 72 and the middle seal body 68. Again, in certain embodiments, the outer metal seal assembly 70 may include a pair of Canh seals, such as R-Canh or MRD-Canh seals. In addition, the upper seal body 72 may be connected to the upper seal actuation ring 76 at seal 84, such that the upper test seal 74 fits between the upper seal body 72 and the upper seal actuation ring 76.

Figure 3A:
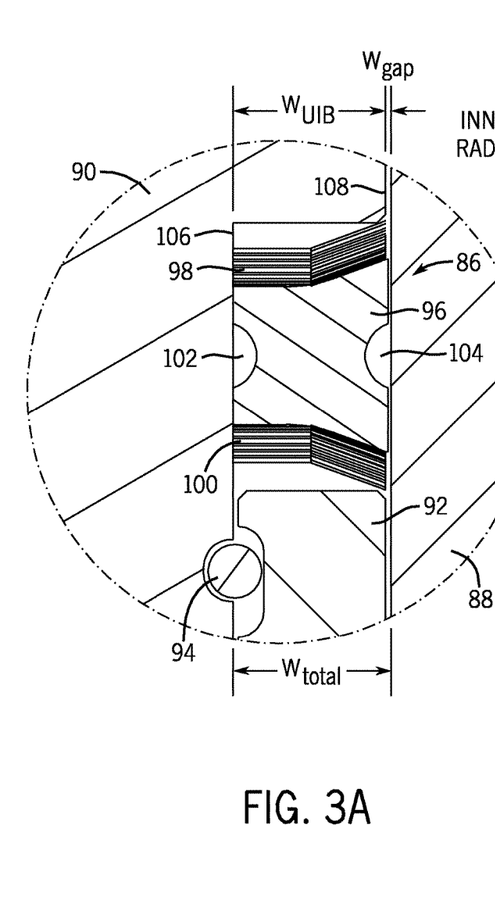
FIG. 3A is a partial cross-section of an exemplary annular seal in a non-deformed ("pre-loaded") shape.
Figure 3B:
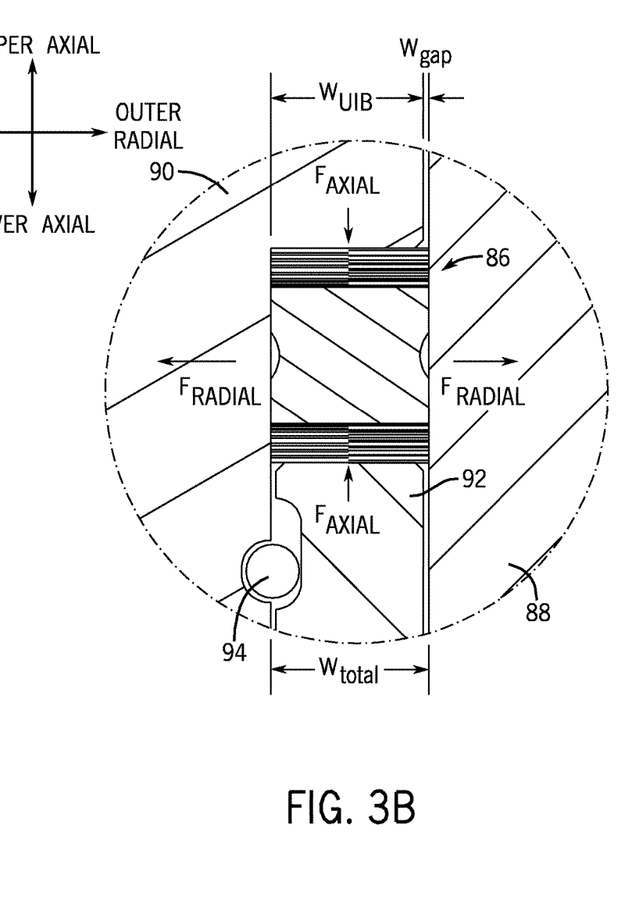
FIG. 3B is a partial cross-section of an exemplary annular seal in a deformed ("loaded") shape.

The upper test seal 74 and the lower test seal 64 may generally be retracted radially while the hanger 28 is run into the wellhead 12, and expanded radially once the hanger 28 is landed and sealed in the wellhead 12. For example, FIGS. 3A and 3B depict partial cross-sections of an exemplary annular seal 86 in a non-deformed ("pre-loaded") shape and a deformed ("loaded") shape, respectively. The annular seal 86 may, for instance, be either the lower test seal 64 or the upper test seal 74, illustrated in FIG. 2. The annular seal 86 may be located between a radially outer body 88, an upper radially inner body 90, and a lower radially inner body 92. In addition, the upper inner body 90 and the lower inner body 92 may be separated by another seal 94. For instance, if the annular seal 86 is the upper test seal 74 of FIG. 2, the outer body 88 may be the casing spool 26, the upper inner body 90 may be the upper seal actuation ring 76, and the lower inner body 92 may be the upper seal body 72. However, if the annular seal 86 is the lower test seal 64 of FIG. 2, the outer body 88 may be the casing spool 26, the upper inner body 90 may be the middle seal body 68, and the lower inner body 92 may be the lower seal body 62. Furthermore, although illustrated in FIGS. 3A and 3B as being installed between the outer body 88, the upper inner body 90, and the lower inner body 92, the annular seal 86 described herein may be installed within any combination of radially inner and outer bodies and axially upper and lower bodies.

The annular seal 86 may have a cross-sectional composition generally comprised of three sections, e.g., a core seal section 96, a top seal section 98, and a bottom seal section 100. As illustrated, the core seal section 96 is axially between the top and bottom seal sections 98 and 100. The core seal section 96 may be comprised of an elastomer or rubber material while the top seal section 98 and bottom seal section 100 may be comprised of harder materials, such as fabric and certain metals. In particular, the top seal section 98 and the bottom seal section 100 may be configured to urge top and bottom faces of the core seal section 96 into an orthogonal alignment, which may form a seal with the upper inner body 90 and the lower inner body 92. In other words, the top seal section 98 and the bottom seal section 100 may urge the top and bottom faces of the core seal section 96 into a substantially parallel alignment with respect to a radial axis of the core seal section 96 to close the gap of the bore. For instance, the top seal section 98 and the bottom seal section 100 may be pre-loaded in a manner which may tend to urge top and bottom faces of the core seal section 96 toward an alignment which is substantially perpendicular to radially inner and outer faces of the core seal section 96 across the entire surface of the top and bottom faces. In addition, in certain embodiments, the annular seal 86 may include one or more radially inner grooves 102 and one or more radially outer grooves 104 for increasing the sealing volume.

As described above, while the hanger 28 is being run into the wellhead 12, the annular seal 86 may be retracted radially. In other words, the annular seal 86 may be configured such that when in a non-deformed ("pre-loaded") shape, the annular seal 86 has a cross-section with non-orthogonal top and bottom faces and the radial width of the cross-section of the annular seal 86 is approximately equal to the radial width $W_{UIB}$ between a radially inner face 106 and a radially outer face 108 of the upper inner body 90, leaving a gap $W_{gap}$ between the annular seal 86 and the outer body 88. In other words, the total radial width $W_{total}$ between the radially inner face 106 of the upper inner body 90 and the outer body 88 may be equal to the radial width $W_{UIB}$ between the radially inner face 106 and the radially outer face 108 of the upper inner body 90 plus the gap $W_{gap}$. Since there is a gap $W_{gap}$ between the annular seal 86 and the outer body 88 while the hanger 28 is being run into the wellhead 12, the annular seal 86 may be less susceptible to extrusion while, for instance, running through the BOP 36. As such, the annular seal 86 may remain capable of creating tighter seals over the life of the annular seal 86 since damage from extrusion during installation is minimized.

Once the hanger 28 is landed and sealed in the wellhead 12, the annular seal 86 may expand radially as the annular seal 86 deforms into a deformed ("loaded") shape having a cross-section with substantially orthogonal top and bottom faces. In other words, the top and bottom faces may be deformed into being substantially parallel to a radial axis of the annular seal 86. This is due at least in part to the force of the axial load $F_{axial}$ that is distributed between the upper inner body 90 and the lower inner body 92 once the hanger 28 is landed in the wellhead 12. The axial force $F_{axial}$ is created at least in part by the weight of the components above the annular seal 86. As the axial force $F_{axial}$ is applied to the annular seal 86, the core seal section 96 of the annular seal 86 may deform (e.g., axial compression) such that the radial width of the annular seal 86 increases to the total radial width $W_{total}$ between the radially inner face 106 of the upper inner body 90 and the outer body 88 (e.g., radial expansion). More specifically, portions of the core seal section 96 may deform from the top and bottom of the core seal section 96, decreasing the height (e.g., axial compression) of the core seal section 96 but increasing the radial width (e.g., radial expansion) of the core seal section 96. The degree of radial expansion of the core seal section 96 may vary based on the particular geometries used, materials used for the core seal section 96, the amount of the axial force $F_{axial}$, and so forth. However, in certain embodiments, the core seal section 96 may expand radially by 5-10% or more of the radial width of the annular seal 86. As the radial width of the annular seal 86 increases, the annular seal 86 may gradually apply a radial force $F_{radial}$ between the radially inner face 106 of the upper inner body 90 and the outer body 88, creating a seal between the bodies. Also, as illustrated in FIGS. 3A and 3B, the two grooves 102, 104 may slightly deform under the stresses caused by $F_{axial}$ and $F_{radial}$, increasing the sealing volume.

Figure 4:
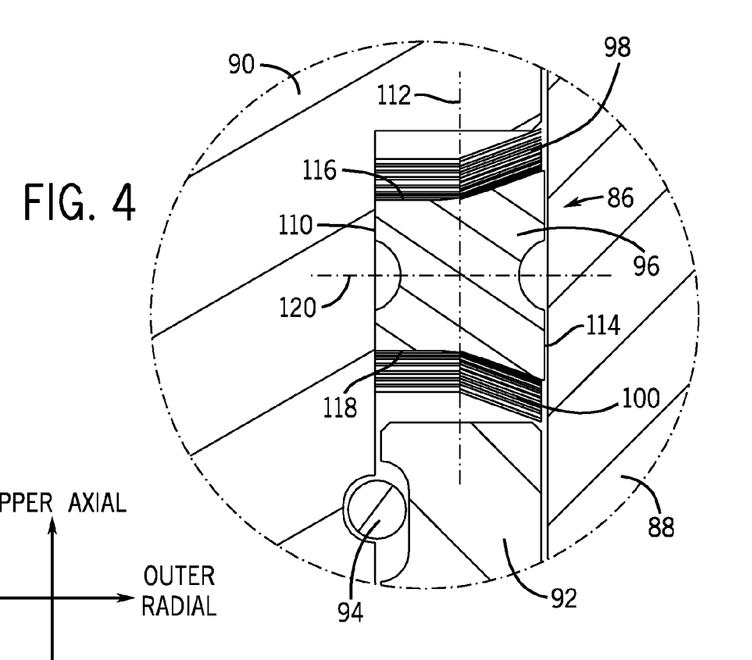
FIG. 4 is a partial cross-section of an exemplary embodiment of an annular seal with a core seal section having a substantially constant axial cross-sectional height from a radially inner face to an axial centerline and a linearly increasing axial cross-sectional height from the axial centerline to a radially outer face.

The particular cross-sectional profile of the core seal section 96 of the annular seal 86 may vary between embodiments. FIGS. 4 through 12 illustrate exemplary embodiments of the annular seal 86 with varying core seal section 96 profiles. For instance, FIG. 4 illustrates an exemplary embodiment of an annular seal 86 with a core seal section 96 having a substantially constant axial cross-sectional height (e.g., axial distance) from a radially inner face 110 of the core seal section 96 to an axial centerline 112 of the core seal section 96 and a linearly increasing (e.g., diverging) axial cross-sectional height (e.g., axial distance) from the axial centerline 112 to a radially outer face 114 of the core seal section 96. In other words, a top face 116 and a bottom face 118 of the core seal section 96 may be characterized as having a substantially orthogonal (e.g., perpendicular to the axial centerline 112 and parallel to a radial centerline 120) section between the radially inner face 110 and the axial centerline 112 and an outwardly angled (e.g., diverging) section between the axial centerline 112 and the radially outer face 114. More specifically, the axial distance between the top and bottom faces 116, 118 and the radial centerline 120 of the core seal section 96 may be substantially constant from the radially inner face 110 to the axial centerline 112 and may increase linearly from the axial centerline 112 to the radially outer face 114.

Figure 5:
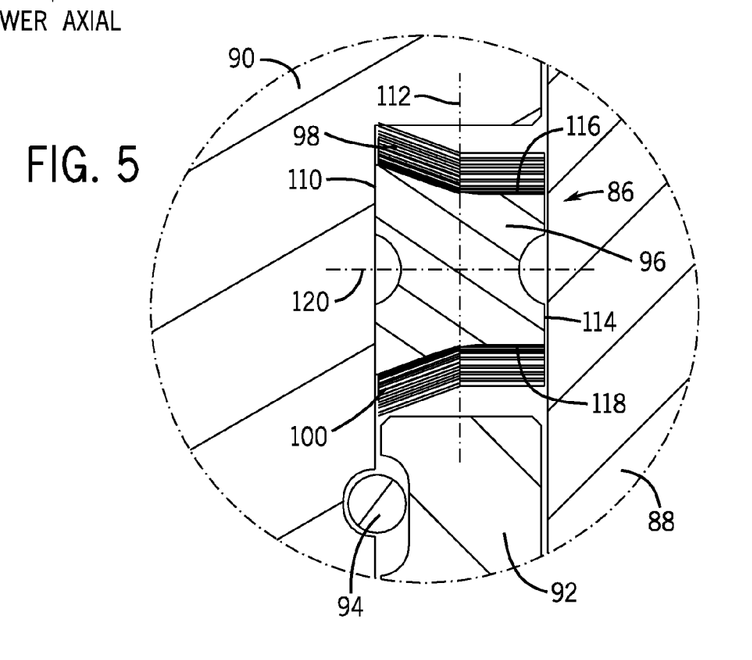
FIG. 5 is a partial cross-section of an exemplary embodiment of an annular seal with a core seal section having a linearly decreasing axial cross-sectional height from the radially inner face to the axial centerline and a substantially constant axial cross-sectional height from the axial centerline to the radially outer face.

Conversely, FIG. 5 illustrates an exemplary embodiment of an annular seal 86 with a core seal section 96 having a linearly decreasing (e.g., converging) axial cross-sectional height (e.g., axial distance) from the radially inner face 110 of the core seal section 96 to the axial centerline 112 of the core seal section 96 and a substantially constant axial cross-sectional height (e.g., axial distance) from the axial centerline 112 to the radially outer face 114 of the core seal section 96. In other words, the bottom face 116 and the top face 118 of the core seal section 96 may be characterized as having an inwardly angled (e.g., converging) section between the radially inner face 110 and the axial centerline 112 and a substantially orthogonal (e.g., perpendicular to the axial centerline 112 and parallel to a radial centerline 120) section between the axial centerline 112 and the radially outer face 114. More specifically, the axial distance between the top and bottom faces 116, 118 and the radial centerline 120 of the core seal section 96 may decrease linearly from the radially inner face 110 to the axial centerline 112 and may be substantially constant from the axial centerline 112 to the radially outer face 114.

Figure 6:
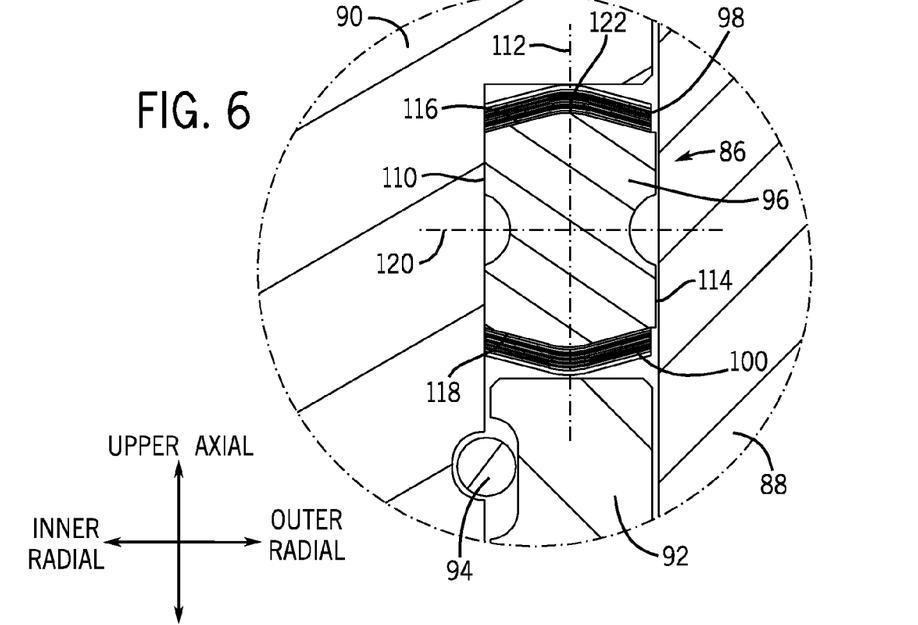
FIG. 6 is a partial cross-section of an exemplary embodiment of an annular seal with a core seal section having a linearly increasing axial cross-sectional height from the radially inner face to the axial centerline and a linearly decreasing axial cross-sectional height from the axial centerline to the radially outer face.

FIG. 6 illustrates an exemplary embodiment of an annular seal 86 with a core seal section 96 having a linearly increasing (e.g., diverging) axial cross-sectional height (e.g., axial distance) from the radially inner face 110 of the core seal section 96 to the axial centerline 112 of the core seal section 96 and a linearly decreasing (e.g., converging) axial cross-sectional height (e.g., axial distance) from the axial centerline 112 to the radially outer face 114 of the core seal section 96. In other words, the bottom face 116 and the top face 118 of the core seal section 96 may be characterized as having an outwardly angled (e.g., diverging) section between the radially inner face 110 and the axial centerline 112 and an inwardly angled (e.g., converging) section between the axial centerline 112 and the radially outer face 114, with the high point 122 of the profile occurring generally at the axial centerline 112. More specifically, the axial distance between the top and bottom faces 116, 118 and the radial centerline 120 of the core seal section 96 may increase linearly from the radially inner face 110 to the axial centerline 112 and may decrease linearly from the axial centerline 112 to the radially outer face 114.

Figure 7:
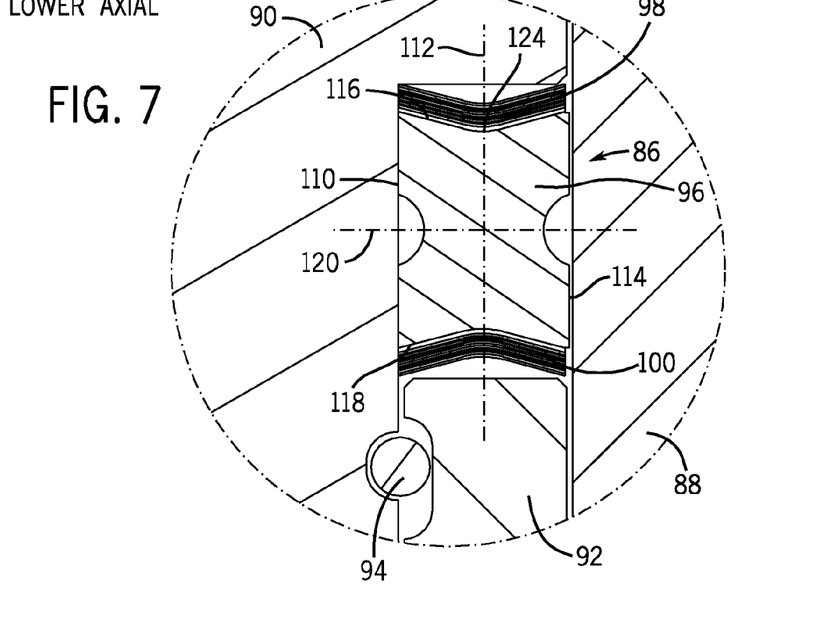
FIG. 7 is a partial cross-section of an exemplary embodiment of an annular seal with a core seal section having a linearly decreasing axial cross-sectional height from the radially inner face to the axial centerline and a linearly increasing axial cross-sectional height from the axial centerline to the radially outer face.

Conversely, FIG. 7 illustrates an exemplary embodiment of an annular seal 86 with a core seal section 96 having a linearly decreasing (e.g., converging) axial cross-sectional height (e.g., axial distance) from the radially inner face 110 of the core seal section 96 to the axial centerline 112 of the core seal section 96 and a linearly increasing (e.g., diverging) axial cross-sectional height (e.g., axial distance) from the axial centerline 112 to the radially outer face 114 of the core seal section 96. In other words, the bottom face 116 and the top face 118 of the core seal section 96 may be characterized as having an inwardly angled (e.g., converging) section between the radially inner face 110 and the axial centerline 112 and an outwardly angled (e.g., diverging) section between the axial centerline 112 and the radially outer face 114, with the low point 124 of the profile occurring generally at the axial centerline 112. More specifically, the axial distance between the top and bottom faces 116, 118 and the radial centerline 120 of the core seal section 96 may decrease linearly from the radially inner face 110 to the axial centerline 112 and may increase linearly from the axial centerline 112 to the radially outer face 114.

Figure 8:
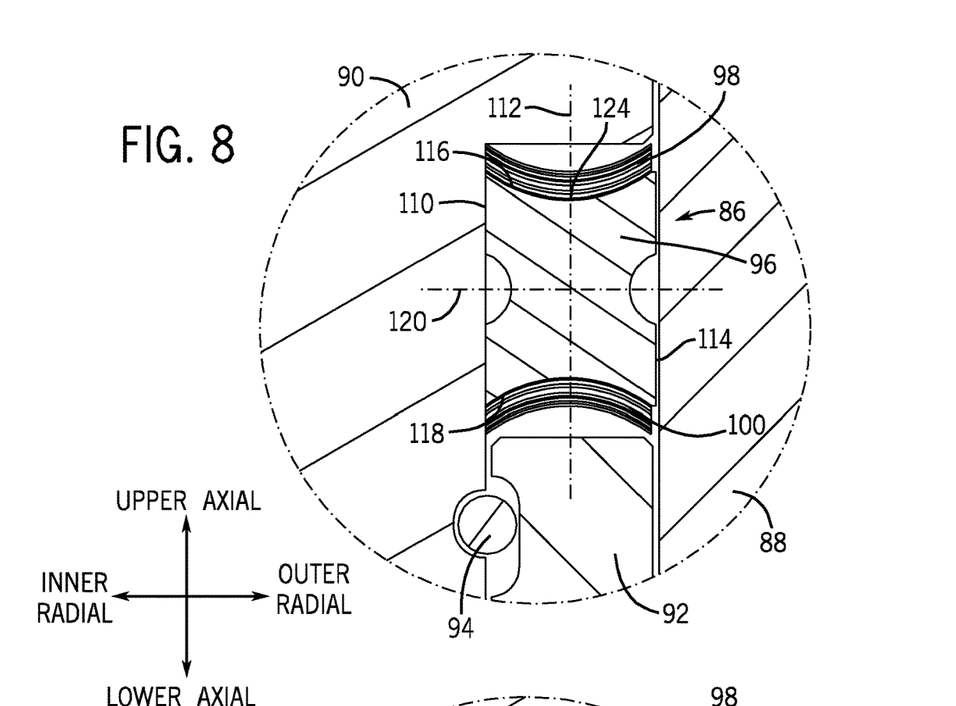
FIG. 8 is a partial cross-section of an exemplary embodiment of an annular seal with a core seal section having a non-linearly decreasing axial cross-sectional height from the radially inner face to the axial centerline and a non-linearly increasing axial cross-sectional height from the axial centerline to the radially outer face.

FIG. 8 illustrates an exemplary embodiment of an annular seal 86 with a core seal section 96 having a non-linearly decreasing (e.g., converging) axial cross-sectional height (e.g., axial distance) from the radially inner face 110 of the core seal section 96 to the axial centerline 112 of the core seal section 96 and a non-linearly increasing (e.g., diverging) axial cross-sectional height (e.g., axial distance) from the axial centerline 112 to the radially outer face 114 of the core seal section 96. More specifically, the bottom face 116 and the top face 118 of the core seal section 96 may be characterized as having a concave profile from the radially inner face 110 to the radially outer face 114, with the low point 124 of the concave profile occurring generally at the axial centerline 112. As such, the axial distance between the top and bottom faces 116, 118 and the radial centerline 120 of the core seal section 96 may decrease non-linearly from the radially inner face 110 to the axial centerline 112, consistent with the concave profile of the top and bottom faces 116, 118. Similarly, the axial distance between the top and bottom faces 116, 118 and the radial centerline 120 of the core seal section 96 may increase non-linearly from the axial centerline 112 to the radially outer face 114, consistent with the concave profile of the top and bottom faces 116, 118.

Figure 9:
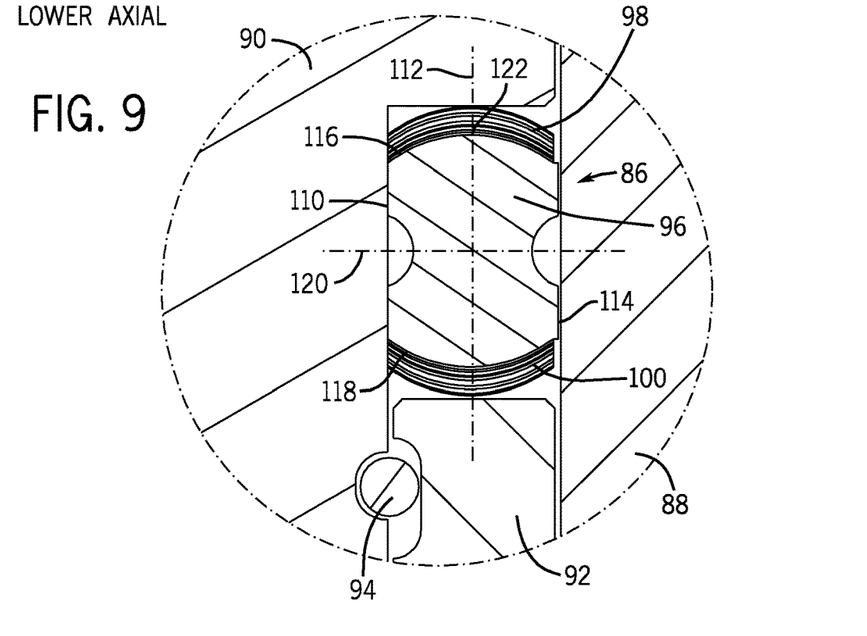
FIG. 9 is a partial cross-section of an exemplary embodiment of an annular seal with a core seal section having a non-linearly increasing axial cross-sectional height from the radially inner face to the axial centerline and a non-linearly decreasing axial cross-sectional height from the axial centerline to the radially outer face.

Conversely, FIG. 9 illustrates an exemplary embodiment of an annular seal 86 with a core seal section 96 having a non-linearly increasing (e.g., diverging) axial cross-sectional height (e.g., axial distance) from the radially inner face 110 of the core seal section 96 to the axial centerline 112 of the core seal section 96 and a non-linearly decreasing (e.g., converging) axial cross-sectional height (e.g., axial distance) from the axial centerline 112 to the radially outer face 114 of the core seal section 96. More specifically, the bottom face 116 and the top face 118 of the core seal section 96 may be characterized as having a convex profile from the radially inner face 110 to the radially outer face 114, with the high point 122 of the convex profile occurring generally at the axial centerline 112. As such, the axial distance between the top and bottom faces 116, 118 and the radial centerline 120 of the core seal section 96 may increase non-linearly from the radially inner face 110 to the axial centerline 112, consistent with the convex profile of the top and bottom faces 116, 118. Similarly, the axial distance between the top and bottom faces 116, 118 and the radial centerline 120 of the core seal section 96 may decrease non-linearly from the axial centerline 112 to the radially outer face 114, consistent with the convex profile of the top and bottom faces 116, 118.

Figure 10:
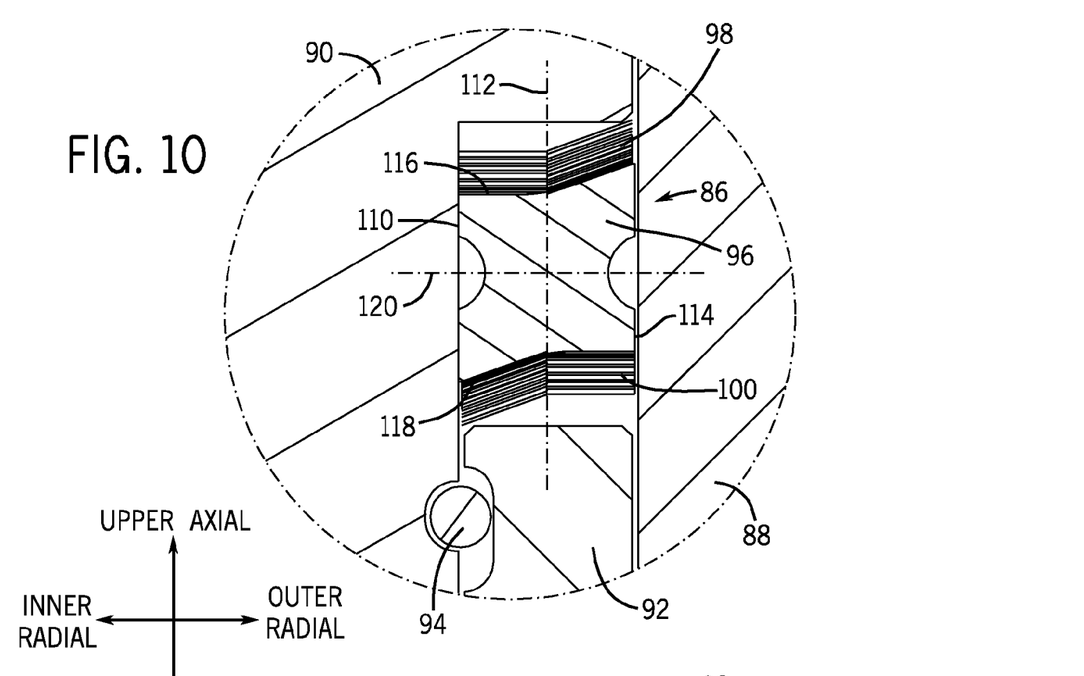
FIG. 10 is a partial cross-section of an exemplary embodiment of an annular seal with a core seal section having an asymmetrical, linearly decreasing axial cross-sectional height from the radially inner face to the axial centerline and an asymmetrical, linearly increasing axial cross-sectional height from the axial centerline to the radially outer face.

FIG. 10 illustrates an exemplary embodiment of an annular seal 86 with a core seal section 96 having an asymmetrical, linearly decreasing (e.g., converging) axial cross-sectional height (e.g., axial distance) from the radially inner face 110 of the core seal section 96 to the axial centerline 112 of the core seal section 96 and an asymmetrical, linearly increasing (e.g., diverging) axial cross-sectional height (e.g., axial distance) from the axial centerline 112 to the radially outer face 114 of the core seal section 96. More specifically, in the illustrated embodiment, the top face 116 of the core seal section 96 may be characterized as having a substantially orthogonal (e.g., perpendicular to the axial centerline 112 and parallel to the radial centerline 120) section between the radially inner face 110 and the axial centerline 112 and an outwardly angled (e.g., diverging) section between the axial centerline 112 and the radially outer face 114. However, conversely, the bottom face 118 of the core seal section 96 may be characterized as having an inwardly angled (e.g., converging) section between the radially inner face 110 and the axial centerline 112 and a substantially orthogonal (e.g., perpendicular to the axial centerline 112 and parallel to the radial centerline 120) section between the axial centerline 112 and the radially outer face 114. As such, the axial distance between the top and bottom faces 116, 118 and the radial centerline 120 of the core seal section 96 may decrease linearly from the radially inner face 110 to the axial centerline 112 and may increase linearly from the axial centerline 112 to the radially outer face 114.

Although FIGS. 4 through 10 illustrate the core seal section 96 have two sections about the axial centerline 112, the axial centerline 122 may actually be any axial datum along the radial width of the core seal section 96. In other words, the transition between sections of the core seal section 96 between the radially inner face 110 and the radially outer face 114 may occur at other locations along the top and bottom faces 116, 118. For example, a transition may occur at a point 5, 10, 15, 20, 25, 30, 35, 40, 45, 50, 55, 60, 65, 70, 75, 80, 85, 90, or 95% of the radial distance between the radially inner face 110 and the radially outer face 114. Indeed, transitions may occur at any point along the top and bottom faces 116, 118. In addition, in certain embodiments, more than one transition may occur along the top and bottom faces 116, 118, creating more than two varying cross-sectional profile sections.

Figure 11:
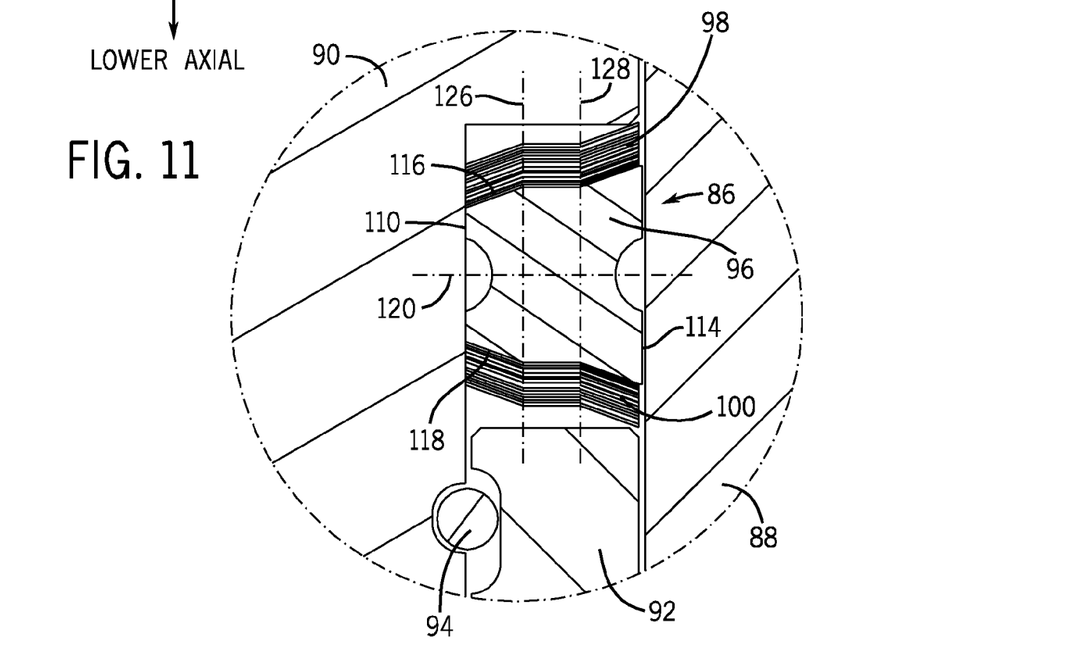
FIG. 11 is a partial cross-section of an exemplary embodiment of an annular seal with a core seal section having more than two varying cross-sectional profile sections.

For instance, FIG. 11 illustrates an exemplary embodiment of an annular seal 86 with a core seal section 96 having more than two varying cross-sectional profile sections. In particular, FIG. 11 depicts an annular seal 86 with a core seal section 96 having a linearly increasing (e.g., diverging) axial cross-sectional height (e.g., axial distance) from the radially inner face 110 of the core seal section 96 to a first axial datum 126 of the core seal section 96, a substantially constant axial cross-sectional height (e.g., axial distance) from the first axial datum 126 to a second axial datum 128 of the core seal section 96, and a linearly increasing (e.g., diverging) axial cross-sectional height (e.g., axial distance) from the second axial datum 128 to the radially outer face 114 of the core seal section 96. In other words, the bottom face 116 and the top face 118 of the core seal section 96 may be characterized as having an outwardly angled (e.g., diverging) section between the radially inner face 110 and the first axial datum 126, a substantially orthogonal (e.g., perpendicular to the first axial datum 126 and the second axial datum 128 and parallel to the radial centerline 120) section between the first axial datum 126 and the second axial datum 128, and another outwardly angled (e.g., diverging) section between the second axial datum 128 and the radially outer face 114. More specifically, the axial distance between the top and bottom faces 116, 118 and the radial centerline 120 of the core seal section 96 may increase linearly from the radially inner face 110 to the first axial datum 126, may be substantially constant from the first axial datum 126 to the second axial datum 128, and may increase linearly from the second axial datum to the radially outer face 114.

Figure 12:
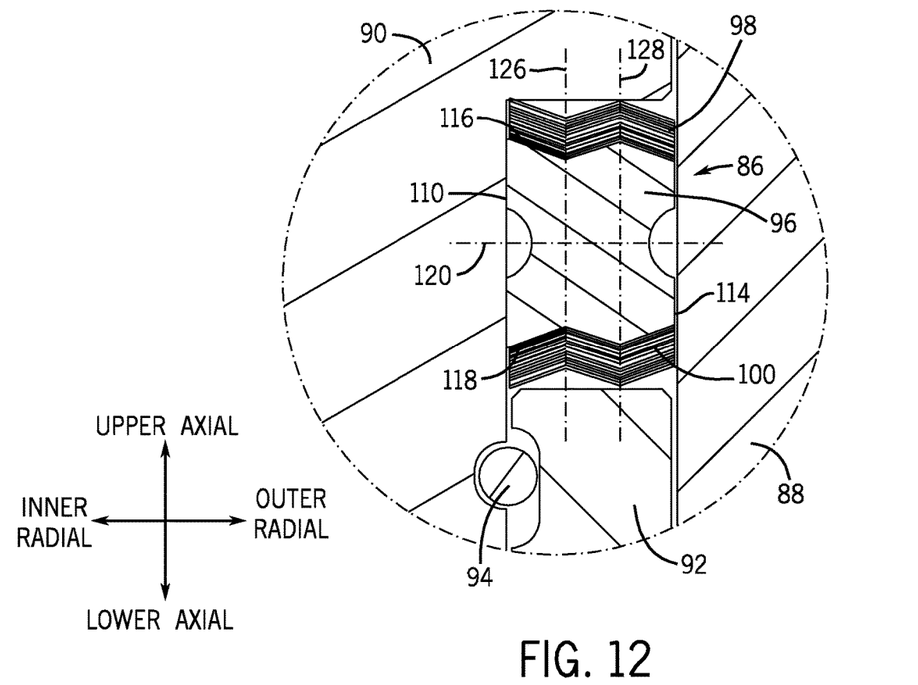
FIG. 12 is another partial cross-section of an exemplary embodiment of an annular seal with a core seal section having more than two varying cross-sectional profile sections.

FIG. 12 illustrates another exemplary embodiment of an annular seal 86 with a core seal section 96 having more than two varying cross-sectional profile sections. In particular, FIG. 12 depicts an annular seal 86 with a core seal section 96 having a linearly decreasing (e.g., converging) axial cross-sectional height (e.g., axial distance) from the radially inner face 110 of the core seal section 96 to the first axial datum 126 of the core seal section 96, a linearly increasing (e.g., diverging) axial cross-sectional height (e.g., axial distance) from the first axial datum 126 to the second axial datum 128 of the core seal section 96, and a linearly decreasing (e.g., converging) axial cross-sectional height (e.g., axial distance) from the second axial datum 128 to the radially outer face 114 of the core seal section 96. In other words, the bottom face 116 and the top face 118 of the core seal section 96 may be characterized as having an inwardly angled (e.g., converging) section between the radially inner face 110 and the first axial datum 126, an outwardly angled (e.g., diverging) section between the first axial datum 126 and the second axial datum 128, and another inwardly angled (e.g., converging) section between the second axial datum 128 and the radially outer face 114. More specifically, the axial distance between the top and bottom faces 116, 118 and the radial centerline 120 of the core seal section 96 may decrease linearly from the radially inner face 110 to the first axial datum 126, may increase linearly from the first axial datum 126 to the second axial datum 128, and may decrease linearly from the second axial datum to the radially outer face 114.

Therefore, as illustrated in FIGS. 3 through 12, the specific cross-sectional geometries of the core seal section 96 may vary between embodiments. However, all of the embodiments illustrated are characterized by substantially non-orthogonal (e.g., not substantially parallel to the radial centerline 120) top and bottom faces 116, 118. As such, as illustrated in FIG. 3B, as the axial force $F_{axial}$ is applied to the top and bottom faces 116, 118 of the core seal section 96, the core seal section 96 may expand radially while the top and bottom faces 116, 118 are forced into a substantially orthogonal (e.g., substantially parallel to the radial centerline 120) shape between the upper inner body 90 and the lower inner body 92. As the core seal section 96 expands radially, a radial force $F_{radial}$ is gradually created between the outer body 88 and the upper inner body 90, creating a seal between these bodies.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
    an annular seal, comprising:
        a top seal section;
        a bottom seal section; and
        a core seal section coupled to and disposed between the top seal section and the bottom seal section, wherein the core seal section comprises top and bottom faces and radially inner and outer faces, wherein, prior to an application of an axial load external from the annular seal, the annular seal itself has at least portions of the top and bottom seal sections angled away from one another and pre-loaded to bias the top and bottom seal sections and the core seal section.

2. The system of claim 1, wherein, prior to the application of the axial load external from the annular seal, the annular seal itself has at least portions of the top and bottom seal sections angled away from one another and angled relative to a radial axis of the annular seal, wherein, after the application of the axial load, the annular seal has the top and bottom seal sections substantially parallel to the radial axis.

3. The system of claim 1, wherein, prior to the application of the axial load, the core seal section comprises an axial cross-sectional height which varies from the radially inner face to the radially outer face.

4. The system of claim 3, wherein, prior to the application of the axial load, the core seal section comprises a substantially constant axial cross-sectional height from the radially inner face to an axial datum of the core seal section and a linearly increasing axial cross-sectional height from the axial datum to the radially outer face.

5. The system of claim 3, wherein, prior to the application of the axial load, the core seal section comprises a linearly decreasing axial cross-sectional height from the radially inner face to an axial datum of the core seal section and a substantially constant axial cross-sectional height from the axial datum to the radially outer face.

6. The system of claim 5, wherein, prior to the application of the axial load, the top face is substantially parallel relative to the radial axis of the core seal section between the radially inner face and the axial datum and outwardly angled between the axial datum and the radially outer face and the bottom face is inwardly angled between the radially inner face and the axial datum and substantially parallel relative to the radial axis of the core seal section between the axial datum and the radially outer face.

7. The system of claim 3, wherein, prior to the application of the axial load, the core seal section comprises a linearly increasing axial cross-sectional height from the radially inner face to an axial datum of the core seal section and a linearly decreasing axial cross-sectional height from the axial datum to the radially outer face.

8. The system of claim 3, wherein, prior to the application of the axial load, the core seal section comprises a linearly decreasing axial cross-sectional height from the radially inner face to an axial datum of the core seal section and a linearly increasing axial cross-sectional height from the axial datum to the radially outer face.

9. The system of claim 3, wherein, prior to the application of the axial load, the core seal section comprises a non-linearly decreasing axial cross-sectional height from the radially inner face to an axial datum of the core seal section and a non-linearly increasing axial cross-sectional height from the axial datum to the radially outer face.

10. The system of claim 3, wherein, prior to the application of the axial load, the core seal section comprises a non-linearly increasing axial cross-sectional height from the radially inner face to an axial datum of the core seal section and a non-linearly decreasing axial cross-sectional height from the axial datum to the radially outer face.

11. The system of claim 3, wherein, prior to the application of the axial load, the core seal section comprises a linearly increasing axial cross-sectional height from the radially inner face to a first axial datum of the core seal section, a substantially constant axial cross-sectional height from the first axial datum to a second axial datum of the core seal section, and a linearly increasing axial cross-sectional height from the second axial datum to the radially outer face.

12. The system of claim 3, wherein, prior to the application of the axial load, the core seal section comprises a linearly decreasing axial cross-sectional height from the radially inner face to a first axial datum of the core seal section, a linearly increasing axial cross-sectional height from the first axial datum to a second axial datum of the core seal section, and a linearly decreasing axial cross-sectional height from the second axial datum to the radially outer face.

13. The system of claim 1, wherein the core seal section is comprised of an elastomer or rubber material, and the top and bottom seal sections are comprised of a metal.

14. A system, comprising:
    an annular seal, comprising:
        a core seal section having top and bottom faces and radially inner and outer faces, wherein the core seal section comprises at least one groove disposed along at least one of the radially inner or outer face at an intermediate position between the top and bottom faces; and
        top and bottom seal sections coupled to and disposed about the core section, wherein the top and bottom seal sections are comprised of one or more first materials harder than a second material of the core seal section, wherein, prior to an application of an axial load external from the annular seal, the annular seal itself has at least portions of the top and bottom seal sections angled away from one another and pre-loaded to bias the top and bottom seal sections and the core seal section.

15. The system of claim 14, wherein the top and bottom faces comprise respective top and bottom face portions that are angled away from one another, and the top and bottom seal sections comprise respective top and bottom portions that are angled away from one another.

16. The system of claim 14, comprising:
a radially inner body;
a radially outer body;
an axially upper body; and
an axially lower body;
wherein the annular seal is disposed between the radially inner body, the radially outer body, the axially upper body, and the axially lower body, wherein the axial load is applied from the axially upper body and the axially lower body, wherein the annular seal is configured to undergo an axial contraction between the top and bottom seal sections and the top and bottom faces of the core seal section and a radial expansion between the radially inner and outer faces of the core seal section after the application of the axial load.

17. The system of claim 16, wherein the annular seal forms a seal against orthogonal faces of the radially inner body, the radially outer body, the axially upper body, and the axially lower body after the application of the axial load.

18. The system of claim 14, wherein, prior to the application of the axial load external from the annular seal, the annular seal itself has at least portions of the top and bottom seal sections angled away from one another and angled relative to a radial axis of the annular seal, wherein, after the application of the axial load, the annular seal has the top and bottom seal sections substantially parallel to the radial axis.

19. A method, comprising:
installing an annular seal having top and bottom faces and radially inner and outer faces between a radially inner body, a radially outer body, an axially upper body, and an axially lower body in a wellhead, wherein the annular seal has top and bottom seal sections coupled to and disposed about a core seal section, wherein, prior to an application of an axial load external from the annular seal, the annular seal itself has at least portions of the top and bottom seal sections angled away from one another and pre-loaded to bias the top and bottom seal sections and the core seal section; and
applying the axial load from the axially upper body and the axially lower body to the top and bottom seal sections of the annular seal, respectively, causing the annular seal to undergo an axial contraction between the top and bottom seal sections and the top and bottom faces of the core seal section and a radial expansion between the radially inner and outer faces of the core seal section.

20. The method of claim 19, wherein:
the top and bottom faces comprise respective top and bottom face portions that are angled away from one another; and
the top and bottom seal sections are comprised of one or more first materials harder than a second material of the core seal section.

21. An annular seal, comprising:
a top seal section;
a bottom seal section; and
a core seal section comprising non-orthogonal top and bottom faces relative to radially inner and outer faces of the core seal section disposed between the top seal section and the bottom seal section, wherein the core seal section is configured to expand radially when an axial load is applied to the top and bottom faces of the core seal section such that the top and bottom faces are deformed into an orthogonal alignment relative to the radially inner and outer faces of the core seal section;
wherein the top face is substantially orthogonal relative to the radial axis of the core seal section between a first radial face and an axial datum and outwardly angled between the axial datum and a second radial face, and the bottom face is inwardly angled between the first radial face and the axial datum and substantially orthogonal relative to the radial axis of the core seal section between the axial datum and the second radial face.

22. The annular seal of claim 21, wherein the first radial face is a radially inner face and the second radial face is a radially outer face.

23. The system of claim 1, wherein the top and bottom seal sections are comprised of one or more first materials harder than a second material of the core seal section.

24. A system, comprising:
an annular seal, comprising:
a core seal section;
a first seal section coupled to a first side of the core seal section; and
a second seal section coupled to a second side of the core seal section opposite from the first side having the first seal section, wherein the first and second seal sections comprise one or more first materials harder than a second material of the core seal section, and the first and second seal sections have respective first and second angled portions that are angled away from one another to pre-load and bias the core seal section prior to application of a load external from the annular seal.

25. The system of claim 24, wherein, prior to the application of the load external from the annular seal, the annular seal itself has the first and second angled portions angled relative to an axis of the annular seal, wherein, after the application of the load, the annular seal has the first and second seal sections substantially parallel to the axis.

26. The system of claim 1, wherein the annular seal is configured to undergo an axial contraction between the top and bottom seal sections and the top and bottom faces of the core seal section and a radial expansion between the radially inner and outer faces of the core seal section after the application of the axial load.

27. The method of claim 19, wherein, prior to the application of the axial load external from the annular seal, the annular seal itself has at least portions of the top and bottom seal sections angled away from one another and angled relative to a radial axis of the annular seal, wherein, after the application of the axial load, the annular seal has the top and bottom seal sections substantially parallel to the radial axis.

28. The system of claim 1, wherein the core seal section is comprised of an elastomer or rubber material, and the top and bottom seal sections are comprised of a fabric.

29. The system of claim 14, wherein the core seal section comprises an elastomer or rubber material, and the top and bottom seal sections comprise a metal.

30. The method of claim 19, wherein the core seal section comprises an elastomer or rubber material, and the top and bottom seal sections comprise a metal.

31. The system of claim 24, wherein the core seal section comprises an elastomer or rubber material, and the first and second seal sections comprise a metal.

\* \* \* \* \*